US011092487B2

(12) United States Patent
Withrow et al.

(10) Patent No.: US 11,092,487 B2
(45) Date of Patent: Aug. 17, 2021

(54) PAINT COLOR AND TINTING STATION

(71) Applicants: Mark W. Withrow, Delaware, OH (US); Douglas R. Withrow, Marion, OH (US)

(72) Inventors: Mark W. Withrow, Delaware, OH (US); Douglas R. Withrow, Marion, OH (US)

( * ) Notice: Subject to any disclaimer, the term of this patent is extended or adjusted under 35 U.S.C. 154(b) by 0 days.

(21) Appl. No.: 16/741,954

(22) Filed: Jan. 14, 2020

(65) Prior Publication Data

US 2020/0225090 A1 Jul. 16, 2020

Related U.S. Application Data

(60) Provisional application No. 62/792,032, filed on Jan. 14, 2019.

(51) Int. Cl.
*G01J 3/02* (2006.01)
*G01J 3/46* (2006.01)
*G01J 3/50* (2006.01)

(52) U.S. Cl.
CPC ........... *G01J 3/0267* (2013.01); *G01J 3/0291* (2013.01); *G01J 3/46* (2013.01); *G01J 3/50* (2013.01)

(58) Field of Classification Search
CPC .......... G01J 3/0267; G01J 3/0291; G01J 3/46; G01J 3/50; B25H 1/04; B25H 1/12; B25H 3/00; B25H 3/04; B62B 3/00; B44D 3/00; A47B 81/00
USPC ....... 108/50.01, 50.02, 44, 106–108, 147.17; 312/223.6, 196, 209; 280/47.35, 79.2; 211/10, 88.01, 90.01; 248/311.3, 109, 248/125.1, 122.1, 235
See application file for complete search history.

(56) References Cited

U.S. PATENT DOCUMENTS

| 843,826 | A | * | 2/1907 | Kloeppinger | |
| 1,608,266 | A | * | 11/1926 | Forbes | A47J 47/16 |
| | | | | | 211/88.01 |
| 2,965,363 | A | * | 12/1960 | Worden | B01F 7/1695 |
| | | | | | 366/197 |
| 3,601,589 | A | | 8/1971 | McCarty | |
| 3,630,385 | A | * | 12/1971 | Searcy | B25H 3/04 |
| | | | | | 211/70.6 |

(Continued)

FOREIGN PATENT DOCUMENTS

| CA | 2899535 | * | 2/2016 |
| EP | 1905327 | * | 4/2008 |

*Primary Examiner* — Janet M Wilkens
(74) *Attorney, Agent, or Firm* — Jacob M. Ward; Ward Law Office LLC (57) ABSTRACT

A paint color analysis station has a main body with a front exterior surface and a rear exterior surface. A paint sampling portion and a drying portion are disposed on the front exterior surface of the main body. The paint sampling portion has a paint sampling surface extending outwardly from the front exterior surface of the main body at an angle that is less than 90 degrees. The drying portion has a main body and an overhang disposed directly above the paint sampling portion. The overhang includes an opening configured to receive a drying device. At least one hanging portion and at least one storage portion are also disposed on the paint color analysis station. The at least one hanging portion and the at least one storage portion are configured to conveniently organize and house various paint analysis tools and accessories when not in operation.

16 Claims, 7 Drawing Sheets

(56) References Cited

U.S. PATENT DOCUMENTS

| | | | | |
|---|---|---|---|---|
| 3,908,563 A * | 9/1975 | Eckart, Jr. | A47F 5/0043 | 108/77 |
| 4,033,652 A * | 7/1977 | O'Brien | A47B 23/02 | 312/245 |
| 4,225,248 A * | 9/1980 | Para | B01F 15/00733 | 366/251 |
| 4,577,788 A * | 3/1986 | Richardson | B43M 99/008 | 108/44 |
| 4,813,000 A | 3/1989 | Wyman et al. | | |
| 5,217,377 A | 6/1993 | Little, Jr. | | |
| 5,379,976 A * | 1/1995 | DeGirolamo | A47F 5/0815 | 248/220.43 |
| 5,452,875 A * | 9/1995 | Kern | A47B 57/045 | 108/108 |
| 5,509,672 A * | 4/1996 | Offerson | B25H 1/04 | 280/47.35 |
| 5,577,817 A * | 11/1996 | Reynolds | A47B 81/00 | 126/299 D |
| 5,743,416 A * | 4/1998 | Yemini | B25H 3/04 | 211/70.6 |
| 5,765,792 A | 6/1998 | Thomas | | |
| 5,884,784 A * | 3/1999 | Betts, Sr. | B01L 9/00 | 206/278 |
| 6,581,891 B1 * | 6/2003 | Byrd | A01K 31/14 | 248/218.4 |
| 7,188,738 B2 * | 3/2007 | Stafford | A61J 7/04 | 211/72 |
| 7,665,811 B2 * | 2/2010 | Johanning | A61G 12/001 | 312/209 |
| 9,242,389 B2 | 1/2016 | Dillon | | |
| 2008/0053931 A1 * | 3/2008 | Newbould | A47G 1/175 | 211/88.01 |
| 2009/0161357 A1 | 6/2009 | Carlson et al. | | |
| 2010/0225213 A1 * | 9/2010 | Carter | B25H 1/02 | 312/258 |
| 2013/0189651 A1 * | 7/2013 | Dillon | B26F 3/02 | 434/98 |
| 2015/0083886 A1 * | 3/2015 | Brown | F16M 11/10 | 248/664 |
| 2015/0187231 A1 * | 7/2015 | Stephanian | H04N 5/22525 | 434/267 |
| 2015/0267847 A1 * | 9/2015 | Smith | B25H 3/02 | 137/560 |
| 2018/0158124 A1 | 6/2018 | Caruso et al. | | |

* cited by examiner

PAINT COLOR AND TINTING STATION

CROSS-REFERENCE TO RELATED APPLICATIONS

This application claims the benefit of U.S. Provisional Application Ser. No. 62/792,032, filed on Jan. 14, 2019. The entire disclosure of the above application is hereby incorporated herein by reference.

FIELD

The present disclosure relates generally to paint color matching and, more specifically, to a paint color analysis station.

BACKGROUND

Paint analysis including the evaluation of paint samples for the purpose of color and finish (gloss and sheen) matching is useful to both vendors and purchasers of paint.

Color testing kits, such as the one described in U.S. Pat. No. 5,217,377 to Little, Jr., as well as various inventive color matching tools such as those described in U.S. Pat. No. 3,601,589 to Mccarty and U.S. Pat. No. 4,813,000 to Wyman et al. are well known in the art. In many cases, a fresh paint sample may be used to confirm correct color formulation and mixing, such as by comparison of the paint sample to a color chip and sheen chart.

Other uses for fresh paint samples include the analysis of paints of unknown color. When the color of a paint is unknown, a fresh paint sample may be prepared and analyzed by a spectrophotometer or colorimeter. The spectrophotometer can then identify the color of the paint and provide to a computer the colorimetric data to create a formulation to reproduce the unknown paint color.

Analysis of the paint can also include determinations of the sheen of the product, the hide of the product, and whether the product is properly drying correctly.

These common paint sampling methods usually require multiple tools and accessories. Currently, there are no comprehensive paint color analysis stations that house the necessary tools and accessories needed to properly create and analyze fresh paint samples in an organized and efficient manner. Tools and accessories may be scattered across a single paint or home improvement store, which is known to be inefficient and time consuming.

There is a continuing need for a customizable and versatile paint color analysis station that organizes and consolidates paint color analysis tools and accessories such that a user is able to perform the necessary paint color analysis efficiently, safely, and accurately. Desirably, the station helps with compliance to 5S workplace quality and safety standards.

SUMMARY

In concordance with the instant disclosure, a customizable and versatile paint color analysis station that organizes and consolidates paint color analysis tools and accessories such that a user is able to perform the necessary paint color analysis efficiently, safely, and accurately, and which helps with compliance to 5S workplace quality and safety standards, has been surprisingly discovered.

In one embodiment, a paint color analysis station includes a main body having a front exterior surface and a rear exterior surface. The paint color analysis station further includes a paint sampling portion disposed on the front exterior surface, a drying portion disposed on the front exterior surface, at least one hanging portion, and at least one storage portion.

In another embodiment, a paint color analysis station includes a main body having a front exterior surface and a rear exterior surface. A paint sampling portion is disposed on the front exterior surface. The paint sampling portion has a paint sampling surface that extends outwardly from the front exterior surface of the main body. A drying portion is disposed on the front exterior surface directly above the paint sampling portion. The drying portion has a main body and an overhang. The overhang has an opening configured to receive a drying device. The paint color analysis station further includes at least one hanging portion and at least one storage portion.

In a further embodiment, a paint color analysis station includes a main body having a front exterior surface and a rear exterior surface. A paint sampling portion is disposed on the front exterior surface and has a paint sampling surface that extends outwardly from the front exterior surface at an angle that is less than ninety degrees (90°). A drying portion is disposed on the front exterior surface directly above the paint sampling portion. The drying portion has a main body and an overhang. The overhang has an opening configured to receive a drying device. At least one hanging portion includes at least one hanging mechanism configured to receive at least one of a paper tower roll, tablet, drawdown card, color swatch, cleaning bottle, tape dispenser, writing instrument, clip, drying rack, and an electric power cord. The at least one hanging portion may further have a disposable glove dispenser for personal protection and container openings flor closer tools. At least one storage portion includes a paint sampling storage portion disposed adjacent the paint sampling surface. Each of the paint sampling portion, the drying portion, and the at least one hanging portion is removably connected to the main body. A position of each of the paint sampling portion, the drying portion, and the at least one hanging portion with reference to the main body is interchangeable.

In yet another embodiment, a paint color analysis station has a main body with a major exterior surface, a sampling portion, a hanging portion, a drying portion, and a storage portion. The main body is fabricated from stainless steel or any other suitable material. The main body of the paint color analysis station may be wall mounted. However, it should be understood that though the paint color analysis station may also be provided as a standalone unit, for example, resting on or attached to a floor. The sampling portion is disposed on the major exterior surface of the main body of the paint color analysis station. The sampling portion extends outwardly from the major exterior surface.

The sampling portion has an inclined surface configured to receive a drawdown card. Advantageously, the incline of the surface militates against undesirable movement of the drawdown card during operation. In particular, the paint sampling portion may be a drawdown table top formed with a one quarter inch (¼ in) glass sheet disposed thereon. It should be appreciated that the use of a glass sheet advantageously assures for a substantially even and firm surface for spreading or drawdown of the paint film in operation.

The sampling portion further includes a clip. The clip holds the drawdown card in place during use. Advantageously, the clip further militates against the drawdown card moving undesirably during use. The sampling portion has a magnet strip. The magnet strip is disposed on a free end of the sample portion. The magnet strip is configured to receive various tools such as paint can openers, for example. The sampling portion has a paint drawdown bar and a paint drawdown bar housing. The paint drawdown bar may be used to spread paint at a substantially even thickness or millage, for example, about a 4-mil paint film. The paint drawdown bar housing is disposed adjacent to an end of the sample portion disposed on the main body. The paint drawdown bar housing is configured to receive the paint drawdown bar. The paint drawdown bar is a rectangular piece of metal configured to spread paint across a drawdown card. The hanging portion is disposed on the major exterior surface of the main body of the paint sample and tinting station. The hanging portion has a plurality of clips. The plurality of clips may be configured to receive various paint sample cards, for example.

The hanging portion has a mount disposed on the major exterior surface. The mount is configured to receive a tablet device. Advantageously, the mount holds the tablet device, used in paint coloring and tinting, during operation. Accordingly, the mount militates against the tablet coming in to contact with paint undesirably. The drying portion is disposed on the major exterior surface of the paint color analysis station. The drying portion extends outwardly from the main body such that it extends over the sample portion.

The drying portion has a substantially flat surface with an opening formed therein. The opening is configured to receive a drying device, for example, a hair dryer. Advantageously, the drying portion holds the drying device over the sample portion. Accordingly, the drying device dries the paint samples created on the drawdown cards. The storage portion is defined by a hollow space under the sample portion. The storage portion is configured to hold a plurality of paint swatches. The storage portion has a cut-out portion formed therein. The cut-out is configured to hold a mallet. The storage portion contains slots configured to receive a plurality of notecards. A plurality of additional accessories is disposed on the main body. A spray bottle holder is disposed on the main body. A tape dispenser is disposed on the main body. A paper towel holder is disposed on the main body. One of ordinary skill in the art may also select other accessories for placement on or adjacent to the main body within the scope of the present disclosure.

It should be understood that the paint color analysis station of the present disclosure, advantageously, provides a consolidated location for the components necessary for paint sampling, analysis, and tinting.

DRAWINGS

The above, as well as other advantages of the present disclosure, will become readily apparent to those skilled in the art from the following detailed description, particularly when considered in light of the drawings described hereafter.

DETAILED DESCRIPTION

The following detailed description and appended drawings describe and illustrate various embodiments of the invention. The description and drawings serve to enable one skilled in the art to make and use the invention and are not intended to limit the scope of the invention in any manner.

A paint color analysis station 2, according to various embodiments of the present disclosure, is shown in FIGS. 1-7. The paint color analysis station 2 includes a main body 4 having a front exterior surface 6 and a rear exterior surface 8. A paint sampling portion 10, a drying portion 12, and at least one hanging portion 14 are disposed on the main body of the paint color analysis station 2. The paint color analysis station is especially configured for organizing and consolidating paint color analysis tools and accessories such that a user is able to perform a paint color analysis efficiently, safely, and accurately.

In certain embodiments, the paint color analysis station 2 further includes at least one storage portion 16. The main body 4, the paint sampling portion 10, the drying portion 12, the at least one hanging portion 14, and the at least one storage portion 16 may be made from stainless steel, plastic, wood, or any other suitable material or combination of materials chosen by a person skilled in the art.

Figure 3:
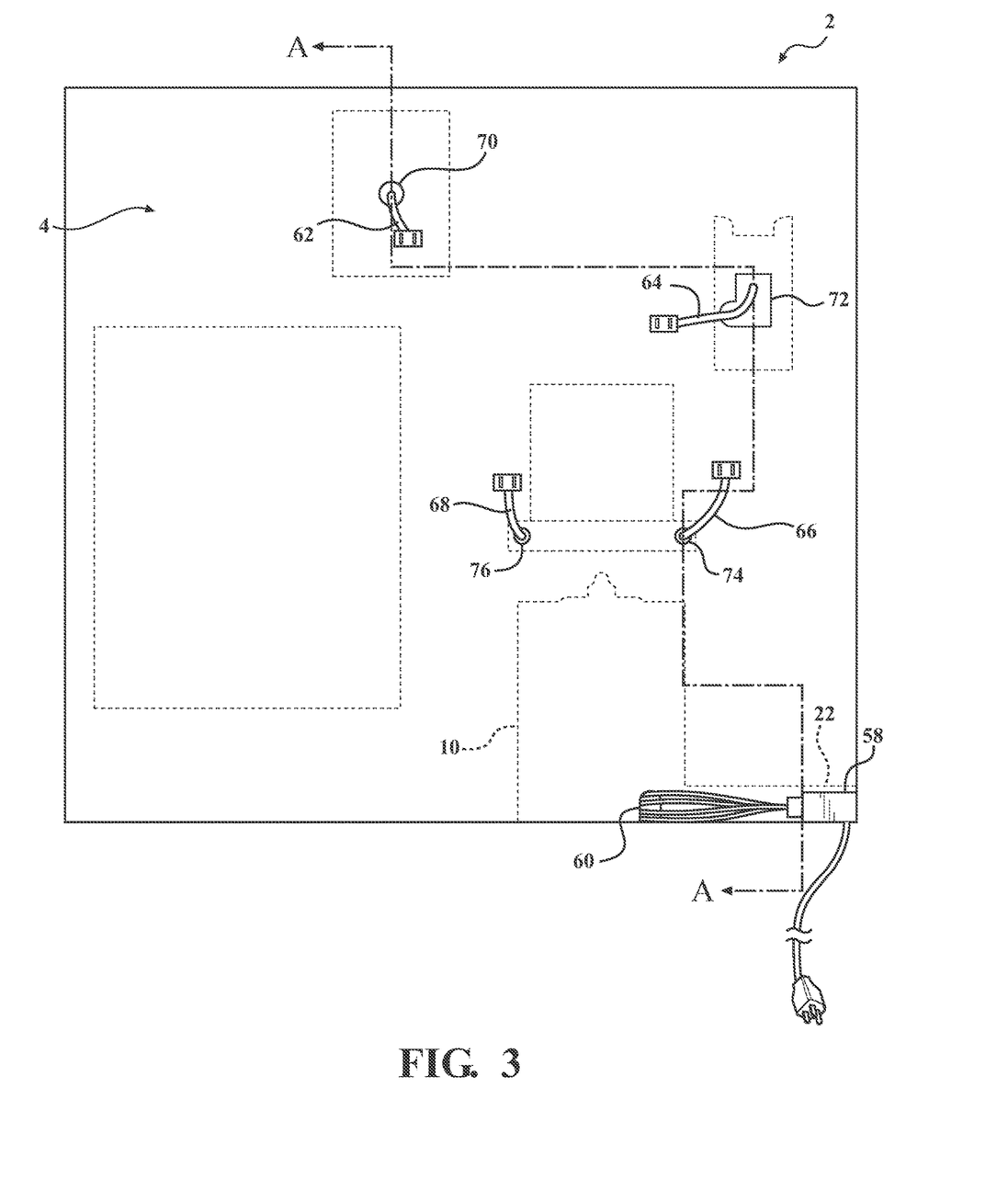
FIG. 3 is a front elevational view of the paint color analysis station shown in FIGS. 1 and 2, with portions removed to show underlying ports and holes for electrical connections.
Figure 4:
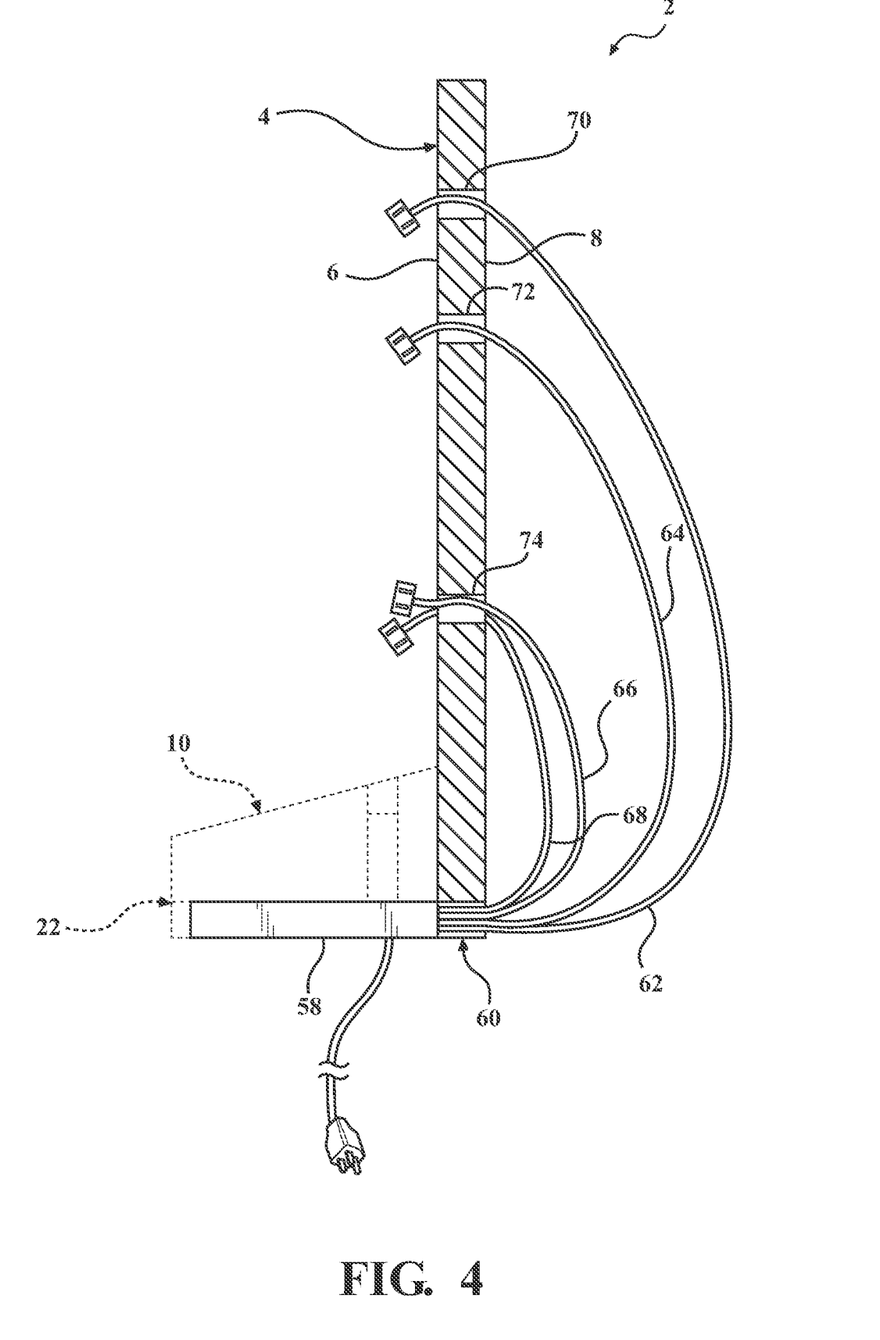
FIG. 4 is a cross-sectional side elevational view of the paint color analysis station taken at section line A-A in FIG. 3, and showing the electrical connections disposed through a main body of the paint color analysis station and connected with a power source.
Figure 5:
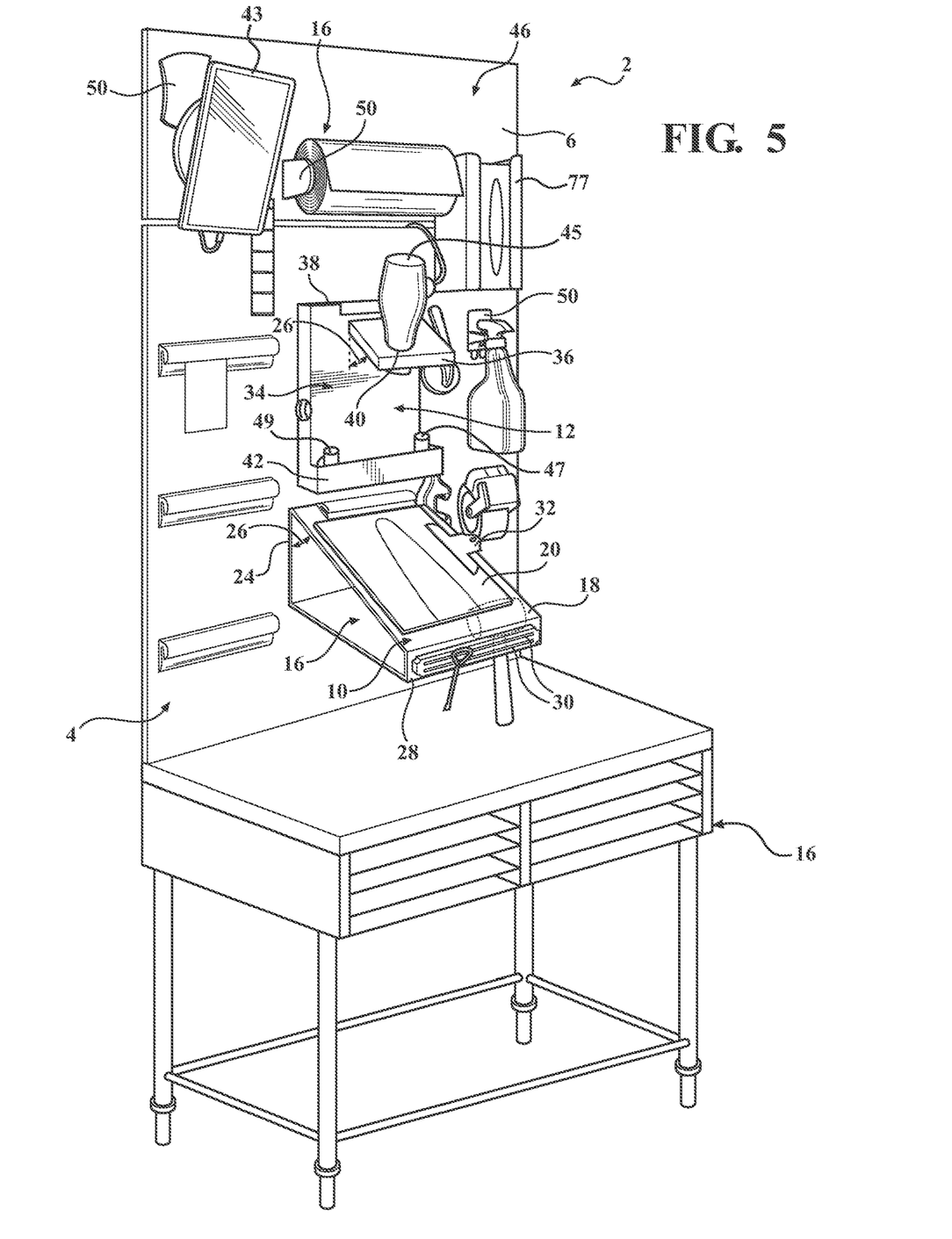
FIG. 5 is a front perspective view of a paint color analysis station according to another embodiment of the present disclosure.
Figure 6:
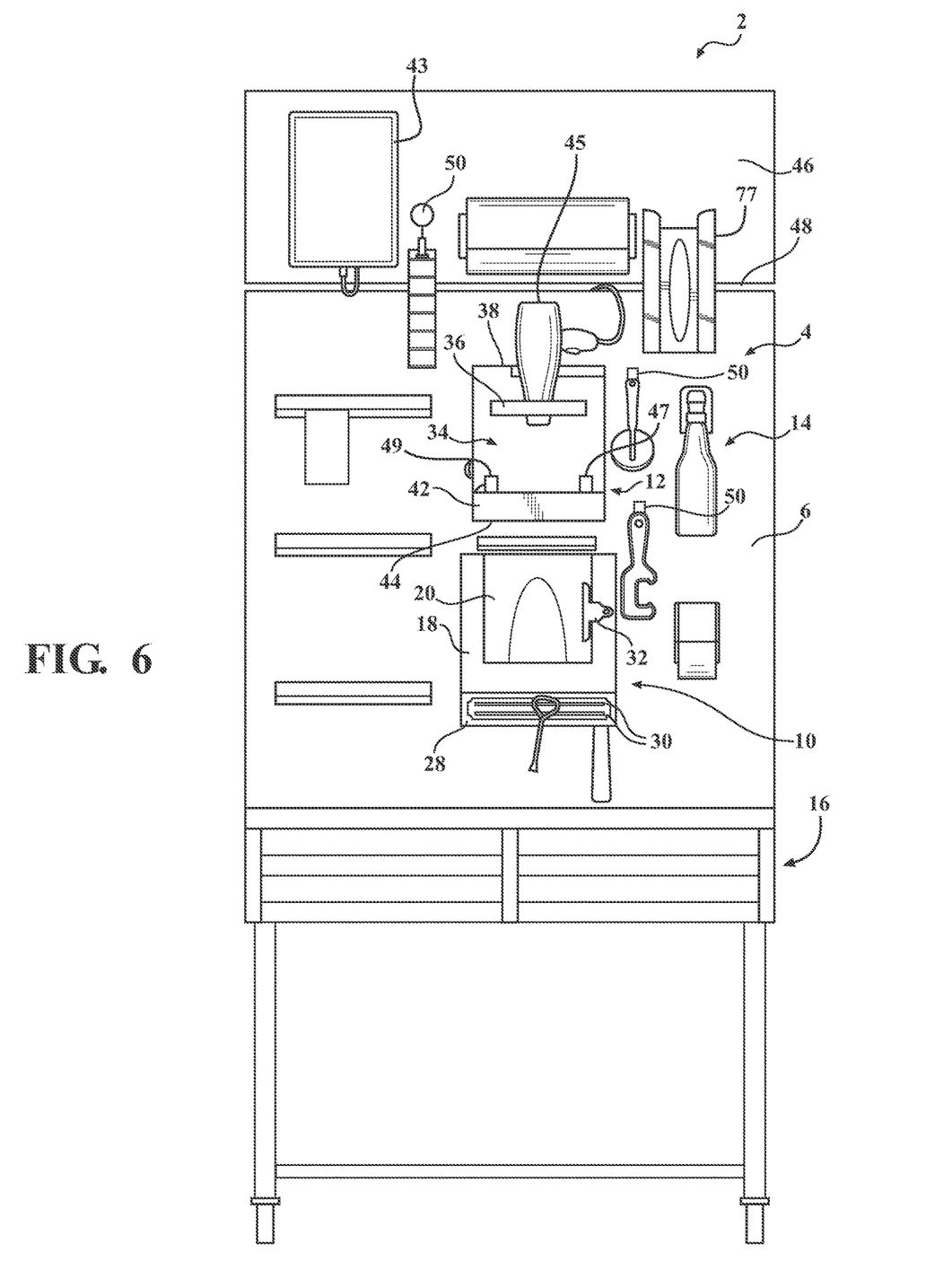
FIG. 6 is a front elevational view of the paint color analysis station shown in FIG. 5.
Figure 7:
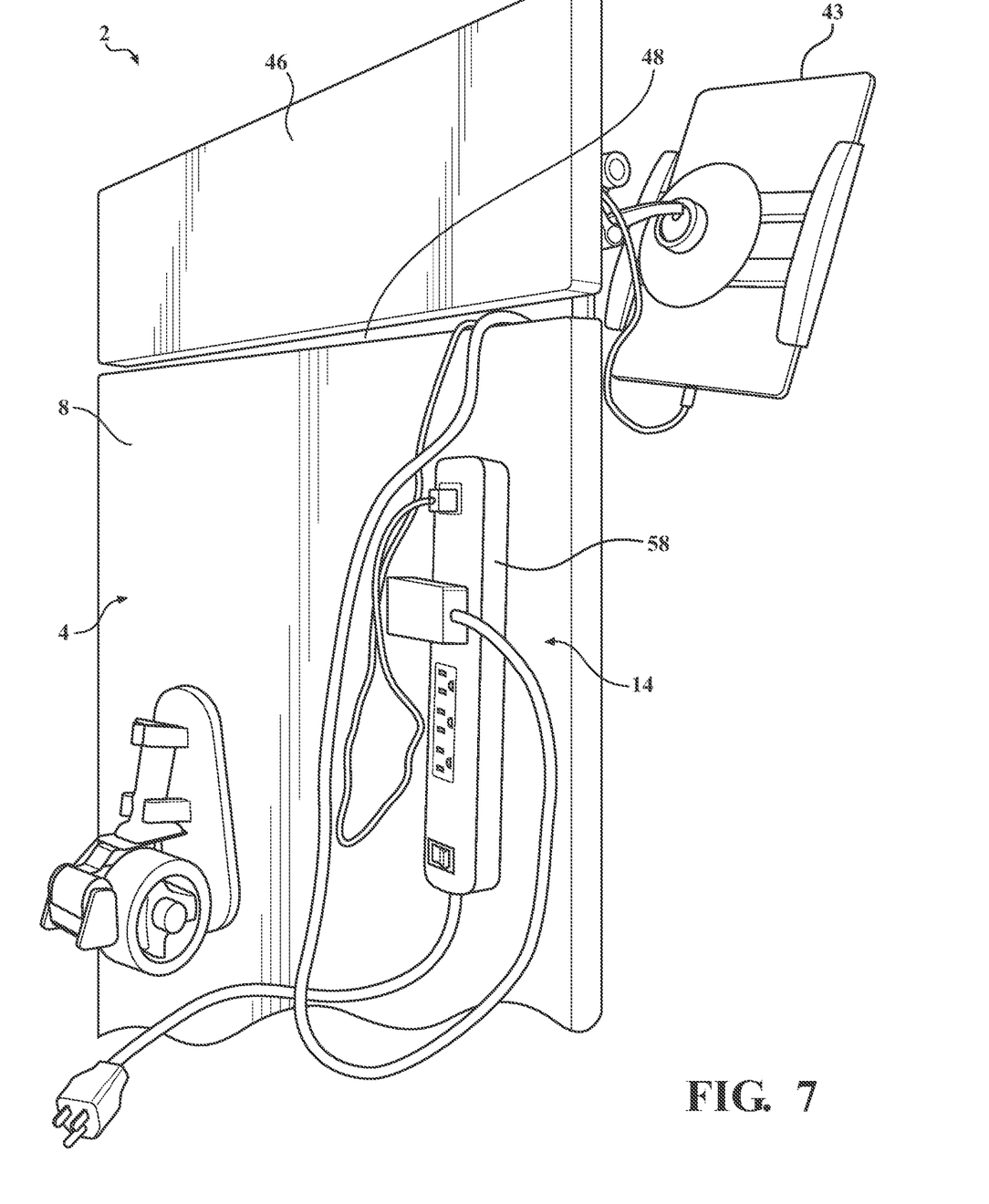
FIG. 7 is a fragmentary rear perspective view of the paint color analysis station shown in FIG. 5.

The shape of the paint color analysis station 2, as well as the height, width, depth, thickness, and any other applicable dimensions may vary according to different embodiments of the disclosure. In certain embodiments, the paint color analysis station 2 is configured to be wall mounted, as shown in FIGS. 1-4. However, the paint color analysis station 2 may be a standalone unit, as shown in FIGS. 3 and 4, or a tabletop unit, as non-limiting examples. The paint color analysis station 2 may include wheels (not shown), handles, or other means for easily transporting the paint color analysis station 2. In other examples, the paint color analysis station 2 may be table mounted, as shown in FIGS. 5-7.

It should be appreciated that the relative locations on the main body 4 of each of the paint sampling portion 10, the drying portion 12, and the at least one hanging portion 14, and each of their associated components as shown in the embodiments of FIGS. 1-4 and FIGS. 5-7, have been surprisingly found to provide for a more efficient and ergonomic use during a paint color analysis operation by the user. As such, it should likewise be appreciated that the relative locations of the components of the paint sampling portion 10, the drying portion 12, and the at least one hanging portion 14, as described further herein, are important to the present disclosure unless otherwise described.

The paint sampling portion 10, in certain embodiments, includes a paint sampling surface 18 configured to receive one or more drawdown cards 20 and a shelf 22 configured to receive items including but not limited to paint cans and color swatches. The paint sampling surface 18 and the shelf 22 may be integral with, permanently or semi-permanently connected to, or separate from one another. In particular, the paint sample surface 18 may be a drawdown table top formed from stainless steel with a one quarter inch (¼ in) glass sheet disposed thereon. Other suitable thicknesses of glass sheet may also be employed. It should be appreciated that the use of a glass sheet advantageously assures for a substantially even and firm surface for spreading or drawdown of the paint film in operation. Additionally, the paint sampling surface 18 and the shelf 22 may be integral with or permanently or semi-permanently connected to the front exterior surface 6 of the main body 4.

As a non-limiting example, the paint sampling surface 18 and the shelf 22 may be removably connected to the front exterior surface 6 using hooks or other connecting means (not shown). Alternatively, the paint sampling surface 18 and the shelf 22 may have a rear wall 24 that is permanently or semi-permanently connected to the main body 4 of the paint color analysis station 2 using screws or any other suitable means for attachment. As shown in FIGS. 3 and 4, in certain embodiments of the present disclosure, the paint sampling portion 10 does not include a shelf 22.

The paint sampling surface 18, in particular embodiments, is a rigid, flat surface made from metal, plastic, wood, or glass as non-limiting examples. A skilled artisan may select any suitable size and shape for the paint sampling surface 18. The paint sampling surface 18 may be adjustable in length and width or interchangeable with paint sampling surfaces 18 of varying dimensions in order to accommodate additional drawdown cards 20 as needed. In certain particular embodiments, for example, the paint sampling surface 18 may have a width of 33 inches for use on a compact paint color analysis station 2 suitable for smaller spaces or a width of forty-four inches (44 in) for use on a large, commercial size paint color analysis station 2 suitable for the evaluation and comparison of multiple drawdown cards 20 at once.

Figure 2:
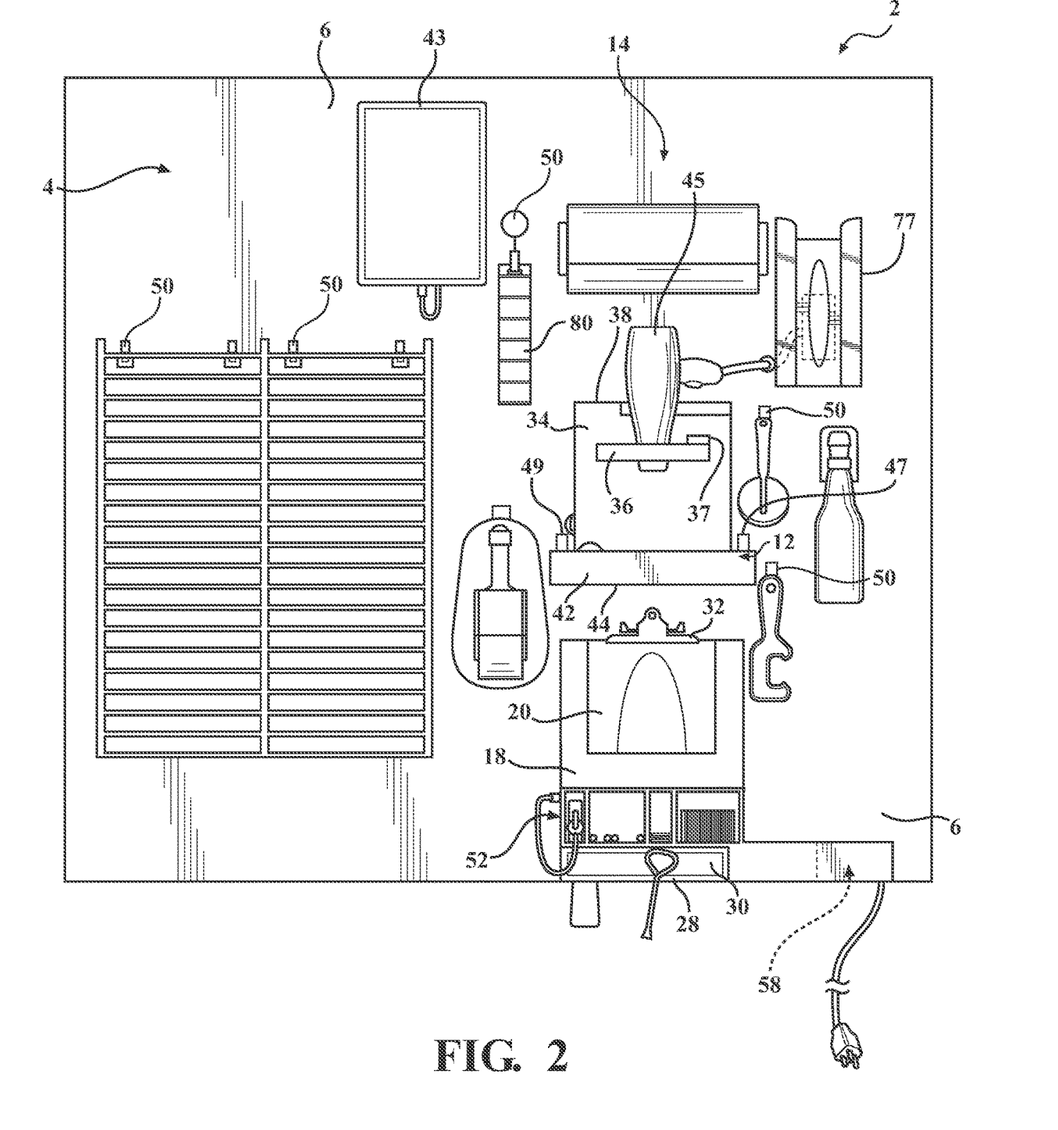
FIG. 2 is a front elevational view of the paint color analysis station shown in FIG. 1.

As shown in FIGS. 2 and 5, the paint sampling surface 18 extends outwardly from the front exterior surface 6 of the main body 4 at an angle 26 that is less than ninety degrees (90°), and more particularly between about thirty degrees (30°) and sixty degrees (60°), and most particularly about forty-five degrees (45°), and in certain particular embodiments causing the paint sampling surface 18 to be inclined or sloping. The angle 26 may be adjustable in certain embodiments of the present disclosure. Advantageously, the inclined paint sampling surface 18 allows for easier and more even distribution of paint samples across the drawdown cards 20. Additionally, the inclined paint sampling surface 18 militates against undesirable movement of the drawdown cards 20 during operation.

In certain embodiments, as shown in FIGS. 1-7, the paint sampling portion 10 includes at least one surface 28 having at least one magnetic strip 30 disposed thereon. The at least one magnetic strip 30 may be integral with or permanently attached to the surface 28, or removably attached to the surface 28 using an adhesive, magnetic coating, or screws, as non-limiting examples, and configured to receive various items such as paint can openers when not in use. A skilled artisan may position the at least one magnetic strip 30 anywhere on the paint sampling portion 10 or the paint color analysis station 2, as desired.

At least one clip 32 may be employed with the station 2 to secure the drawdown cards 20 to the paint sampling surface 18 in operation. The at least one clip 32 further militates against undesirable movement of the drawdown cards 20 during operation. A skilled artisan may also select other suitable means for removably securing the drawn down cards 20 to the paint sampling surface 18.

In some embodiments, the at least one clip 32 may be stored on the at least one magnetic strip 30 when not in use. The at least one clip 32 may be any size and shape suitable for holding the thickness of the drawdown cards 20. In alternative embodiments, the drawdown cards 20 may be secured to the paint sampling surface 18 using adhesives, corner slots, a frame component, or any other suitable means.

As shown in FIGS. 1-7, the drying portion 12 includes a main body 34 integral with or permanently or semi-permanently affixed to the front exterior surface 6 of the main body 4 of the paint color analysis station 2. An overhang 36 extends outwardly from the front exterior surface 6 at a first end 38 of the main body 34 of the drying portion 12. The overhang 36 may be integral with or permanently or semi-permanently affixed to the front exterior surface 6 of the paint color analysis station 2 or the main body 34 of the drying portion 12.

In particular embodiments, the overhang 36 is positioned directly above the paint sampling portion 10, and, more specifically, the paint sampling surface 18. The overhang 36 includes an opening 40 configured to receive a drying device such as an electric hot air blower or hair dryer as a non-limiting example. Advantageously, the overhang 36 including the opening 40 disposed directly above the paint sampling surface 18 is configured to position the drying device in such a manner as to efficiently dry paint samples on the drawdown cards 20 in operation.

The distance between the drying device of the overhang 36 and the underlying paint sample surface 18 may be selected by the skilled artisan, as desired, in order to provide for an efficient drying of paint drawdown samples without distorting or moving the paint drawdown samples undesirably. If the distance is too great, then the paint does not dry efficiently. If the distance is too little, then the paint will be moved by the force of the air from the drying device. In a non-limiting example, the distance may be between about six inches (6") and about two feet (2'), and more particularly about one foot (1'). The selection of the distance will also be based, in part, on factors such as the rate and volume of airflow produced by the drying device and the temperature of the resulting airflow. One of ordinary skill may therefore select other suitable distances for the drying device relative to the paint sample surface 18 within the scope of the present disclosure.

In certain embodiments, the overhang 36 extends outwardly from the front exterior surface 6 of the paint color analysis station 2 at a ninety degree (90°) angle. Alternatively, the overhang 36 may extend out from the front exterior surface 6 of the main body 4 at the same angle 26, or a similar angle, as the paint sampling surface 18 directly below, as shown in FIG. 3. Beneficially, a user does not need to hold the drying device in place to efficiently and evenly dry the paint samples on the drawn down cards 20.

The height of the overhang 36 with reference to the paint sampling surface 18 may be adjustable in certain embodiments, for example, by adjusting the position of the overhang 36 on the main body 34 of the drying portion 12 or by removably connecting the overhang 36 or the main body 34 of the drying portion 12 at various positions on the paint color analysis station 2. For example, the overhang 36 may be connected to the main body 34 with a hinge (not shown) or other adjustable connector that permits for the manual adjusting of the position of the overhang 36. Likewise, the opening 40 may be adjustable or configured to receive drying devices of varying sizes, for example, using flaps or a tapered wall (not shown).

Figure 1:
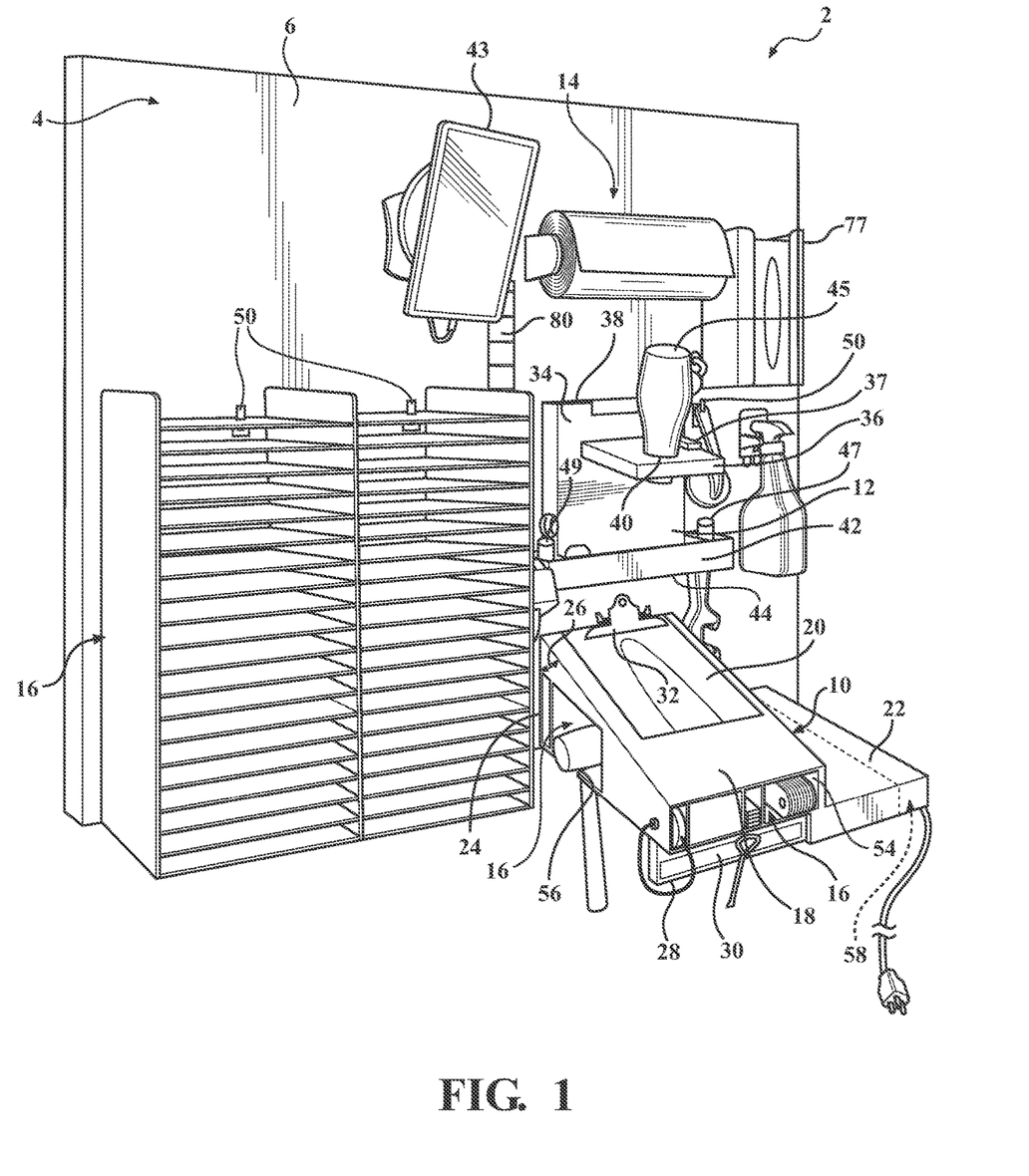
FIG. 1 is a front perspective view of a paint color analysis station according to one embodiment of the present disclosure.

As shown in FIGS. 1 and 2, the overhang 36 may also be configured to hold a wet film gauge 37. A wet film gauge 37 is a tool used to determine a thickness of a wet paint before it dries to determine how thick the paint has been applied.

The wet film gauge 37 may be a flat piece of plastic or metal with ends folded downwardly. The ends of the wet film gauge 37 may be removably disposed in slots (not shown) formed in a side edge of the overhang 36 so that the wet film gauge may be conveniently stored on the overhang 36 when not in use. Other means for removably disposing the wet film gauge 37 on the overhang 36 may also be employed within the scope of the disclosure.

In particular embodiments, as shown in FIGS. 1-7, the station 2 may further include a paint drawdown bar housing 42. The paint drawdown bar housing 42 may be affixed to the drying portion 12 at a second end 44 of the drying portion 12 opposite the first end 38. The paint drawdown bar housing 42 is configured to receive a paint drawdown bar (not shown). The paint drawdown bar is used to spread paint across the drawdown cards 20 and is typically made from metal, plastic, or any other suitable material.

Advantageously, the paint drawdown bar housing 42 is conveniently located in close proximity to the paint sampling portion 10 such that the user can efficiently utilize and subsequently store the paint drawdown bar in operation. The paint drawdown bar housing 42 may be separate from the drying portion 12 in certain embodiments and otherwise connected to the paint color analysis station 2. In certain embodiments, the paint sampling portion 10 and the drying portion 12 may be integral with one another.

The at least one hanging portion 14 may also be disposed on the paint color analysis station 2 on the front exterior surface 6, the rear exterior surface 8, the paint sampling portion 10, the drying portion 12, the at least one storage portion 16, or any combination thereof.

With reference to FIGS. 1-4, and in particular embodiments, the various electrical components 43, 45, 47, 49 of the paint color analysis station 2 may be placed in electrical communication with a power source 58 such as a power strip connected to a power outlet (not shown) of a building or location housing the paint color analysis station. The electrical components 43, 45, 47, 49 are suitable for use in the color analysis at the station 2. As non-limiting examples, suitable electrical components may include the dryer 43, a tablet computer 45 such as an IPAD® from Apple Company in Cupertino, Calif., USA, color sensors 47 such as the NIX™ color sensor from Nix Sensor Ltd. in Hamilton, Ontario, Canada, and spectrophotometers 49 such as the Color-Eye® spectrophotometer available from X-Rite, Incorporated in Grand Rapids, Mich., USA. Other suitable electrical components for the paint color analysis station 2 may also be powered by the power source 58.

In a most particular embodiment, the power source 58 may be disposed inside of the shelf 22, as shown in FIGS. 1-4. As shown in FIG. 3, the main body 4 may have a notch 60 formed in a base thereof that receives electrical cables 62, 64, 66, 68 extending from the rear exterior surface 8 to the front exterior surface 6 and in electrical communication with the power source. The main body may further a plurality of ports 70, 72, 74, 76, each of which receives one of the electrical cables 62, 64, 66, 68 that extend therethrough from the rear exterior surface 8 to the front exterior surface 6, as shown in FIG. 3. Each of the electrical components may thereby be provided with power from the power source 58 without having the lengths of the cables 62, 64, 66, 68 disposed adjacent the front exterior surface 6 where they might otherwise interfere with use of the various electrical components and other portions of the paint color analysis station 2. One of ordinary skill in the art may select other suitable types, numbers, and locations of the ports 70, 72, 74, 76, as desired.

As also shown in FIGS. 3 and 4, a disposable glove dispenser 77 may be removable disposed over the port 72, which may be used to provide electrical power to the dryer. It should be appreciated that dryer may require a ground fault protector as known in the art, which in turn may require that the port 72 be larger than the other ports 70, 74, 76. The disposable glove dispenser 77 is particularly removable so that the dryer may be easily replaced. The disposable glove dispenser 77 may be removably attached to the front exterior surface 6 of the main body 4 using any suitable mechanical fastener, such as clips, screw, bolts, and the like, within the scope of the present disclosure.

With renewed reference to FIGS. 1 and 2, it should be appreciated that the hanging portion 14 may also have at least one paint color strip 80 removably attached thereto, for example, with a hanging mechanism 50. The at least one paint color strip 80 may assist the user in a color and finish matching operation.

Referring now to FIGS. 5-7, and in certain embodiments, the main body 4 of the paint color analysis station 2 may include at least one additional section 46. The at least one additional section 46 may be configured to provide additional surface area for the at least one hanging portion 14, for example, as shown in FIGS. 5-7. The at least one additional section 46 may be spaced apart from the main body 4 forming an opening 48 through which cords extending from an area adjacent the rear exterior surface 8 to an area adjacent the front exterior surface 6 pass. For example, as shown in FIGS. 5-7, various cords may extend from a power outlet (not shown) located adjacent the rear exterior surface 8, through the opening 48 between the main body 4 and the additional section 46, to a drying device or tablet, as non-limiting examples, disposed on or adjacent to the front exterior surface 6 of the paint color analysis station 2.

In particular embodiments of the disclosure, the at least one hanging portion 14 includes one or more fasteners or hanging mechanisms 50 used to secure various paint color analysis tools that are useful during operation to the paint color analysis station 2. For example, the at least one hanging portion 14 may include hanging mechanisms 50 configured to receive paper tower rolls, tablets or other devices, drawdown cards 20, color swatches, cleaning supplies, tape dispensers, writing instruments, tools, clips, towels, disposable gloves, drying racks, and power cords, as non-limiting examples. One of ordinary skill in the art may also select other tools or accessories for placement on the paint color analysis station 2 within the scope of the present disclosure.

The hanging mechanisms 50 may be integral with or permanently or removably attached to the paint color analysis station 2. A skilled artisan may select any combination of suitable hanging mechanisms 50 such as screws, clips, hooks, mounts, magnets, and adhesives, as non-limiting examples, to secure the various paint color analysis tools to the paint color analysis station 2. In certain embodiments, the hanging mechanisms 50 are easily disconnected and reconfigured on the paint color analysis station 2. Customization of the configuration of the hanging mechanisms 50 on the paint color analysis station 2, advantageously, improves efficiency of the paint color analysis process and ease of use for the user. Additionally, strategic placement of the hanging mechanisms 50 militates against paint and other liquids spilling, tools and other accessories falling and breaking, and undesirable damage to the paint color samples on the drawdown cards 20.

The at least one storage portion 16 may be disposed on the paint color analysis station 2 on the front exterior surface 6, the rear exterior surface 8, the paint sampling portion 10, the drying portion 12, the at least one hanging portion 14, or any combination thereof. The at least one storage portion 16 may include any combination of compartments, containers, shelves, bins, slots, openings, or other storing mechanisms as determined by a skilled artisan. In one particular example, as shown in FIG. 1, at least one of the storage portions 16 may be a plurality of shelves having a depth of at least nine inches (9 in) so as to accommodate sheets of 8½×11-inch paper, which may be used for the drawdown procedure. A skilled artisan may select other suitable dimensions for the openings of the at least one storage portion 16, as desired.

In a particular embodiment, a paint sampling storage portion 52 is integral with the paint sampling portion 10 and includes a combination of hollow compartments 54 and cut-out spaces 56 for storing various paint color analysis tools and accessories, as shown in FIGS. 1-4. Advantageously, the hollow compartments 54 and cut-out spaces 56 of the paint sampling storage portion 52 are disposed under the paint sampling portion 10 and provide easy to access and organized tools and accessories such as color swatches, drawdown cards 20, clips, mallets and other items that the user may need to retrieve during operation. In an alternative embodiment, the paint sampling storage portion 52 may be integral with or attached to the shelf 22.

It should be understood that the paint color analysis station 2 of the present disclosure, advantageously, provides an organized, consolidated location for paint color analysis tools and accessories used for paint color sampling, analysis, and tinting. As a result, the user is able to perform the necessary paint color analysis efficiently, safely, and accurately. Additionally, the paint color analysis station 2 is configured for easy data entry, easy clean up, and a generally streamlined process from start to finish. The multitude of customizable options included in the paint color analysis station 2 makes for a versatile workspace that is appropriate in a variety of settings ranging from personal workspaces to commercial operations.

While certain representative embodiments and details have been shown for purposes of illustrating the invention, it will be apparent to those skilled in the art that various changes may be made without departing from the scope of the disclosure, which is further described in the following appended claims.

What is claimed is:

1. A paint color analysis station, comprising:
   a main body having a front exterior surface and a rear exterior surface;
   a paint sampling portion disposed on the front exterior surface, the paint sampling portion including a paint sampling surface and a shelf extending outwardly from the front exterior surface of the main body, the paint sampling surface extending outwardly from the front exterior surface at an angle that is less than ninety degrees, the paint sampling surface configured to receive at least one drawdown card, wherein at least one clip secures a drawn down card to the paint sampling surface;
   a drying portion disposed on the front exterior surface, the drying portion including a main body and an overhang, the overhang having an opening configured to receive a drying device;
   at least one hanging portion; and
   at least one storage portion.

2. The paint color analysis station of claim 1, wherein the paint color analysis station is one of a wall-mounted unit, a standalone unit, and a tabletop unit.

3. The paint color analysis station of claim 1, wherein the main body, the paint sampling portion, the drying portion, the at least one hanging portion, and the at least one storage portion are made from at least one of stainless steel, plastic, and wood.

4. The paint color analysis station of claim 1, wherein the paint sampling portion includes a paint sampling storage portion configured to receive color swatches and drawdown cards.

5. The paint color analysis station of claim 1, wherein the overhang is positioned directly above the paint sampling portion.

6. The paint color analysis station of claim 1, wherein the at least one hanging portion includes at least one hanging mechanism configured to receive at least one of a paper tower roll, a tablet, a drawdown card, a color swatch, a cleaning bottle, a tape dispenser, a writing instrument, a clip, a drying rack, and an electric power cord.

7. The paint color analysis station of claim 1, wherein the at least one hanging portion is disposed on at least one of the front exterior surface, the rear exterior surface, the paint sampling portion, the drying portion, and the at least one storage portion.

8. The paint color analysis station of claim 1, wherein the at least one storage portion is disposed on at least one of the front exterior surface, the rear exterior surface, the paint sampling portion, the drying portion, and the at least one hanging portion.

9. The paint color analysis station of claim 1, wherein the main body includes an additional section disposed adjacent the main body, and wherein the main body and the additional section are separated by an opening through which one or more cords pass through.

10. The paint color analysis station of claim 1, wherein the overhang extends outwardly from the front exterior surface at an angle that is less than ninety degrees.

11. The paint color analysis station of claim 10, wherein the paint sampling surface and the overhang extend outwardly from the front exterior surface at the same angle.

12. The paint color analysis station of claim 1, wherein the at least one storage portion includes a paint sampling storage portion disposed adjacent the paint sampling surface, and a position of the overhang relative to the paint sampling surface is adjustable.

13. The paint color analysis station of claim 1, wherein each of the paint sampling portion, the drying portion, and the at least one hanging portion is removably connected to the main body, and wherein a position of each of the paint sampling portion, the drying portion, and the at least one hanging portion with reference to the main body is interchangeable.

14. The paint color analysis station of claim 1, further comprising a drying device, the drying device including one of an electric hot air blower or hair dryer.

15. A paint color analysis station, comprising:
   a main body having a front exterior surface and a rear exterior surface;
   a paint sampling portion disposed on the front exterior surface, the paint sampling portion including a paint sampling surface and a shelf extending outwardly from the front exterior surface of the main body, the paint sampling surface extending outwardly from the front exterior surface at an angle that is less than ninety degrees, the paint sampling surface configured to receive at least one drawdown card;
   a drying portion disposed on the front exterior surface, the drying portion including a main body and an overhang, the overhang having an opening configured to receive a drying device, wherein the drying portion includes a paint drawdown bar housing;
at least one hanging portion;
at least one storage portion;
a wet film gauge, wherein the overhang of the drying portion is configured to hold the wet film gauge; and
a paint drawdown bar disposed in the paint drawdown bar housing.

16. A paint color analysis station, comprising:
a main body having a front exterior surface and a rear exterior surface;
a paint sampling portion disposed on the front exterior surface, the paint sampling portion including a paint sampling surface and a shelf extending outwardly from the front exterior surface of the main body, the paint sampling surface extending outwardly from the front exterior surface at an angle that is less than ninety degrees, the paint sampling surface configured to receive at least one drawdown card, wherein the paint sampling surface includes a glass sheet;
a drying portion disposed on the front exterior surface, the drying portion including a main body and an overhang, the overhang having an opening configured to receive a drying device;
at least one hanging portion; and
at least one storage portion.

* * * * *